Patented Aug. 4, 1953

2,647,930

UNITED STATES PATENT OFFICE 2,647,930

CATALYTIC REDUCTION OF NITROOLEFINS

John B. Tindall, Terre Haute, Ind., assignor to Commercial Solvents Corporation, Terre Haute, Ind., a corporation of Maryland No Drawing. Application May 11, 1949,
Serial No. 92,732

11 Claims. (Cl. 260—590)

My invention relates to a novel method for the reduction of nitroolefins. More particularly, it is concerned with a procedure for the catalytic reduction of nitroolefins in the liquid phase to produce the corresponding ketones and amines, with the ketones being produced in predominant amounts. Nitroolefins which may be satisfactorily reduced in accordance with the process of my invention are represented by the following general structural formula:

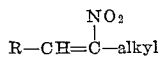

in which R may be either alkyl or aryl.

This case is a continuation-in-part application of my application, U. S. Serial No. 563,096, filed November 11, 1944, now abandoned.

Nitroolefins of the above general type have previously been reduced in accordance with a variety of procedures, some of which have involved electrolytic reduction; reduction with nascent hydrogen, i. e. utilization of mixtures such as iron and hydrochloric acid; reduction with molecular hydrogen in the presence of a noble metal catalyst and a mineral acid, etc. While all of the aforementioned methods can be utilized for reduction of nitroolefins, none of them is free from certain material disadvantages. For example, with procedures involving electrolytic reduction, the yields of desired products are quite low. Certain of the methods are capable of reducing only specific types of nitroolefins included by the above general formula while still other procedures involving the use of noble metal catalysts and mineral acids, although rather effective, have two marked disadvantages from the standpoint of their commercial application, i. e., the type of catalyst required for such procedures is very expensive and the presence of mineral acids in the hydrogenation apparatus presents serious corrosion problems. Furthermore, although catalytic reduction has been effected in accordance with the procedure just mentioned, no one, to my knowledge, has ever been able to reduce nitroolefins successfully in the presence of a nickel catalyst. In all prior attempts of which I am aware certain bimolecular compounds and/or intractable polymeric compounds were obtained.

It is an object of my invention to provide a method for reducing nitroolefins of the above type which is capable of giving a comparatively high total yield of amines and ketones.

It is a further object of my invention to provide a process for the reduction of such nitroolefins whereby the reaction may be conveniently controlled to produce the corresponding ketone in predominant amounts. The reaction also may be controlled to produce the corresponding amines in predominating amounts according to the procedure described in my co-pending application, U. S. Serial No. 92,731, filed of even date herewith.

Other objects will be apparent from the description which follows:

I have now discovered that the above and other objects can be accomplished by subjecting nitroolefins of the aforesaid type to the action of molecular hydrogen in the presence of Raney nickel catalyst, an organic acid and an inert solvent in which the acid can ionize. In accordance with my invention, a mixture comprising the desired nitroolefin, Raney nickel catalyst, an organic acid and the solvent is charged to a suitable hydrogenation apparatus and subjected to a hydrogen pressure ranging from 500–2000 pounds at temperatures of between 30 and 100° C.

The above reduction is effected in water or an aqueous organic solvent medium. In this connection the expression "aqueous medium" is to be interpreted as including water and aqueous mixtures of various organic solvents such as benzene, toluene, methanol, butanol, etc. Also, it may be mentioned in this connection that another factor tending to influence the final composition of the reduction mixture is the strength of the acid utilized. Accordingly, with stronger acids, within the limits described, the proportionate yield of ketone is increased as well as the total yield of amine and ketone.

The organic acid utilized in carrying out my process is any of such acids having an ionization constant between about $1.4 \times 10^{-5}$ and $1.1 \times 10^{-3}$. Examples of acids of this strength include lactic, acetic, propionic, butyric, tartaric, valeric, formic and the like. Also, anhydrides of acids of the aforesaid type can be used. The quantity of acid employed can vary, and has been found not to be particularly critical, with the exception that at least about one mole of acid should be used for each mole of nitroolefin to be reduced. The term "organic acid" as applied to my invention does not include the halogen derivatives of the organic acids such as chlor propionic, brom propionic and the like, even though some of such derivatives have dissociation constants within the range specified, due to the harmful effect of the halogen on the catalyst.

From the above it can be seen that several variables affect the proportion of ketone formed in relation to the amine. Thus ketone formation is favored by the presence of water in the medium, and by strong acid conditions. The latter condition may be said to depend somewhat on the kind of solvent used. If the solvent is one in which the acid may ionize substantially completely, a relatively weak organic acid (with dissociation constants between about $1.4 \times 10^{-5}$ and $1.86 \times 10^{-5}$) can be used because upon ionization such acid becomes very strongly active. On the other hand, when a strong organic acid (with dissociation constant between about $1.86 \times 10^{-5}$ and $1.1 \times 10^{-3}$) is used, the kind of solvent employed becomes of less importance because some degree of ionization will take place in almost any solvent. It is because of the ease with which organic acids are ionized in water that aqueous conditions are so important when predominant amounts of ketones are desired as products of the reduction.

The explanation for the effect of these variables probably lies in the nature of the reaction involved, although I do not wish to be limited to any particular theory of operation. I have found that when nitroolefins are reduced in accordance with my invention, the first reaction occurring is the formation of hydroxylamines. It is understood, however, that simultaneously with this reaction small quantities of nitroolefins are also reduced directly to the amine. Upon further reduction, the hydroxylamine is rearranged to form an oxime. It is at this stage that the conditions mentioned above either favor the formation of the ketone or the amine. Whether the ketone or amine is then formed in predominating amounts depends upon whether or not the reaction conditions favor hydrolysis of the oximes. If the conditions do not favor hydrolysis of the oximes to form ketones, the oxime is, upon further reduction, converted into the corresponding amines. Accordingly, therefore, if the medium contains a strong acid, such an acid, when dissolved in an inert solvent in which it can ionize, tends to cause hydrolysis of the oxime to give a greater proportion of ketone. Likewise, if a weaker acid is used in the medium, and sufficient water is present to cause the weak acid to become very active by ionization, hydrolysis is favored with an accompanying increase in ketone production. It is understood, however, that amine formation may be favored even though a strong acid is used, provided there is no solvent (either water or organic solvents) present in which the acid may ionize.

Some amines are always formed during the reduction, even under conditions most favorable to hydrolysis, partly because the nitroolefin is reduced directly to the amine, and partly because some of the oxime is reduced to the amine even under the adverse conditions. Likewise, some ketone is always formed, even under conditions adverse thereto, because sufficient water is liberated during the reaction to cause at least a small portion of the acid to ionize, thus causing hydrolysis of a small portion of the oxime to the corresponding ketone.

If the reduction of the nitroolefins is carried out in the absence of an organic acid, under either neutral or basic conditions, the yields of both amines and ketones are substantially reduced. The presence of the organic acid is necessary in order to eliminate or minimize the formation of undesirable condensation products, which otherwise will be produced in predominating amounts. Inorganic acids cannot be used in my process due to their tendency to poison the Raney nickel catalyst.

Solvents suitable for use in the medium in my process includes a wide variety of organic solvents. Any organic solvent which is inert to the reactants and products at the conditions employed and in which the organic acid may ionize is satisfactory for use in my process. Examples of solvents coming within the above definition include a wide variety of alcohols, ethers, esters, and hydrocarbons such as for example, methanol, ethanol, propanol, ethyl ether, propyl ether, benzene, toluene, ethyl hexyl ether, methyl acetate, ethyl formate, amyl acetate, hexadecane, octadecane, and the like.

If a substantially water-insoluble solvent is used, even in the absence of water other than that formed by the reaction, the ketone is produced in larger quantities than is the amine.

When the reaction appears to be complete, the reduction mixture is withdrawn from the hydrogenation apparatus and the crude product refined by various methods, depending on the initial composition of the reaction mixture used. In general, the reaction mixture is acidified with hydrochloric acid or sulphuric acid and the extraneous materials removed by distillation. The non-basic oil is then separated from the residue by extraction with benzene or a similar solvent and the resultant extract distilled to recover the ketone. The amine, which is present in the aqueous portion of the reaction mixture in the form of its inorganic salt, is liberated by the addition of a suitable base such as sodium hydroxide. The amine thus liberated is then removed from the aqueous mixture by extraction with benzene and the benzene extract fractionally distilled to obtain the substantially pure amine. In certain instances, it may be found desirable to separate the amine from the aforesaid alkaline aqueous mixture by steam distillation.

My invention may be further illustrated by the following specific examples.

EXAMPLE I

A mixture consisting of 200 g. of 1-phenyl-2-nitro-1-propene, 75 cc. of formic acid (88%), 600 cc. of water, and 15 g. of Raney nickel catalyst was placed in a rocking bomb and hydrogenated at 1000 pounds pressure and a temperature of 71–74° C. Upon completion of the reduction, the reaction mixture was filtered and the filtered cake was washed with 500 cc. of methanol. Fifty-five cc. of sulphuric acid was next added to the filtrate and washings, and the mixture then fractionated to remove formic acid as methyl formate, and excess methanol. The layers in the residue were separated and the oil was washed with water, after which the latter was extracted with benzene. The oil layer and benzene extracts thus obtained were then fractionated to yield 118.7 g. of phenylacetone, a yield of 72%. The aqueous layer was then made alkaline with sodium hydroxide and distilled. A large quantity of ammonia was first obtained after which 12.4 g. of 2-amino-1-phenylpropane was obtained corresponding to a yield of 7.5%.

The data appearing in the table below illustrate the applicability of my invention to the reduction of both aliphatic and aromatic nitroolefins, as well as various conditions under which such results can be obtained.

Table I

| Nitroolefin | Medium | Acid | Amine Yield, Percent | Ketone Yield, Percent |
|---|---|---|---|---|
| 1-phenyl-2-nitro-1-butene | benzene and water | acetic | 11.2 | 55.0 |
| 1-(p-isopropyl-phenyl)-2-nitro-propene | water | do | | 43.5 |
| 2-nitro-2-hexene | do | formic | 16.0 | 72.8 |
| 1-phenyl-2-nitro-pentene | methanol | acetic | 34.8 | 40.5 |
| 1-(m-tolyl)-2-nitro-propene | water | do | 9.5 | 39.0 |
| 1-(p-methoxy-phenyl)-2-nitro-propene | do | do | 15.0 | 56.6 |
| 4-phenyl-2-nitro-2-pentene | do | do | | 36.0 |
| 1-phenyl-2-nitro-1-propene | do | tartaric | 12.7 | 59.6 |

In the following table, the results of a series of reductions of 2-nitro-1-phenyl-1-propene are given. Each of these reductions was carried out exactly according to the procedure described in Example I, except that varying solvents, acids, and quantities of reactants were used.

Table II

| Run Number | wt. of phenyl-nitro-propene, grams | Solvent and Volume, cc. | Acid and wt.-gram | Yield of Amine, Percent | Yield of Ketone, Percent | Total Yield |
|---|---|---|---|---|---|---|
| 1 | 200 | Water, 500 | acetic, 75 | 14.5 | 61.1 | 75.6 |
| 2 | 408 | Water, 450 | acetic, 150 | 11.7 | 55.2 | 66.9 |
| 3 | 200 | Benzene, 600 | acetic, 70 | 23.4 | 57.3 | 80.7 |
| 4 | 250 | do | acetic, 85 | 21.6 | 51.0 | 72.6 |
| 5 | 100 | do | acetic anhydride, 125 | 30.9 | 53.3 | 84.2 |
| 6 | 250 | Water, 600 | acetic, 85 | 23.4 | 54.0 | 77.4 |
| 7 | 200 | Water, 300 | Formic, 60 | 10.5 | 54.0 | 64.5 |
| 8 | 400 | Water, 400 | Formic, 120 | 5.7 | 66.7 | 72.4 |
| 9 | 200 | Water, 300 / Methanol, 300 | Formic, 75 | 10.8 | 64.5 | 75.3 |
| 10 | 200 | Water, 600 | do | 7.5 | 72.0 | 79.5 |
| 11 | 200 | Methanol, 600 | do | 25.0 | 45.6 | 70.6 |
| 12 | 200 | Water, 600 | tartaric, 100 | 12.7 | 59.6 | 72.3 |
| 13 | 200 | Water, 300 | acetic, 300 | 13.5 | 53.0 | 66.5 |

It is to be understood, of course, that my invention is not to be construed as limited to the particular examples given above, since numerous variations will readily occur to those skilled in the art. In general, it may be said that in a process involving the reduction of nitroolefins of the aforesaid type to their corresponding amines and ketones in which the ketones are produced in predominating amounts, by liquid phase hydrogenation in the presence of Raney nickel catalyst and an organic acid of the type described, lies within the scope of my invention.

I claim:

1. In a process for the reduction of nitroolefins of the type:

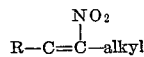

wherein R represents a member selected from the group consisting of alkyl and aryl, to produce a mixture of amines and ketones containing a predominant proportion of ketones, the improvement which comprises subjecting a mixture consisting of a nitroolefin of the aforesaid type, an inert organic solvent, and an organic carboxylic acid having an ionization constant of between about $1.86 \times 10^{-5}$ and $1.1 \times 10^{-3}$, said acid being substantially completely ionized, to the action of molecular hydrogen in the presence of Raney nickel catalyst at elevated pressure.

2. The process of claim 1 wherein the nitroolefin is 1-phenyl-2-nitro-1-propene.

3. The process of claim 1 wherein the nitroolefin is 2-nitro-2-hexene.

4. The process of claim 1 wherein the nitroolefin is 1-(p-methoxyphenyl)-2-nitropropene.

5. In a process for the reduction of nitroolefins of the type:

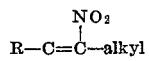

wherein R represents a member selected from the group consisting of alkyl and aryl, to produce a mixture of amines and ketones containing a predominant proportion of ketones, the improvement which comprises subjecting a mixture consisting of a nitroolefin of the aforesaid type, an inert organic solvent, an organic carboxylic acid having an ionization constant of between about $1.4 \times 10^{-5}$ and $1.1 \times 10^{-3}$, and sufficient water to cause substantially complete ionization of the organic acid, to the action of molecular hydrogen in the presence of Raney nickel catalyst at elevated pressure.

6. In a process for the reduction of nitroolefins of the type:

$$R-C=\overset{NO_2}{\underset{|}{C}}-alkyl$$

wherein R represents a member selected from the group consisting of alkyl and aryl, to produce a mixture of amines and ketones containing a predominant proportion of ketones, the improvement which comprises subjecting a mixture consisting of a nitroolefin of the aforesaid type, an inert organic solvent, and an organic carboxylic acid having an ionization constant between about $1.86 \times 10^{-5}$ and $1.1 \times 10^{-3}$, said acid being substantially completely ionized to the action of molecular hydrogen in the presence of Raney nickel catalyst at temperatures between about 40 and 100° C. and at pressures between about 500 and 2000 pounds per square inch.

7. In a process for the reduction of nitroolefins of the type:

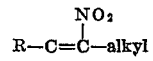

wherein R represents a member selected from the group consisting of alkyl and aryl, to produce a mixture of amines and ketones containing a predominant proportion of ketones, the improvement which comprises subjecting a mixture consisting of a nitroolefin of the aforesaid type, an organic carboxylic acid having an ionization constant between about $1.4 \times 10^{-5}$ and $1.1 \times 10^{-3}$, and sufficient water to cause substantially complete ionization of the organic acid, to the action of molecular hydrogen in the presence of Raney nickel catalyst at elevated pressure.

8. In a process for the reduction of nitroolefins of type:

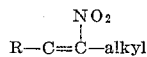

wherein R represents a member selected from the group consting of alkyl and aryl, to produce a mixture of amines and ketones containing a predominant proportion of ketones, the improvement which comprises subjecting a mixture consisting of a nitroolefin of the aforesaid type, an inert water-insoluble organic solvent, and an organic carboxylic acid having an ionization constant of between about $1.4 \times 10^{-5}$ and $1.1 \times 10^{-3}$, said acid being ionized by the water of reaction produced to the action of molecular hydrogen in the presence of Raney nickel catalyst at elevated pressure.

9. In a process for the reduction of nitroolefins of the type:

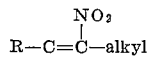

wherein R represents a member selected from the group consisting of alkyl and aryl, to produce a mixture of amines and ketones in which the ketone is present in predominating amount, the improvement which comprises subjecting a nitroolefin of the aforesaid type to the action of molecular hydrogen in the presence of Raney nickel catalyst, at elevated pressures and in the presence of an inert organic solvent solution of an organic carboxylic acid having an ionization constant between about $1.4 \times 10^{-5}$ and $1.1 \times 10^{-3}$ and sufficient water to cause substantially complete ionization of the acid.

10. In a process for the reduction of nitroolefins of the type:

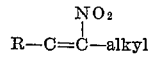

wherein R represents a member selected from the group consisting of alkyl and aryl, to produce a mixture of amines and ketones in which the ketone is present in predominating amounts, the improvement which comprises subjecting a nitroolefin of the aforesaid type to the action of molecular hydrogen in the presence of Raney nickel catalyst, at elevated pressures and in the presence of an organic carboxylic acid having an ionization constant between about $1.4 \times 10^{-5}$ and $1.1 \times 10^{-3}$ and sufficient water to cause substantially complete ionization of the organic acids.

11. In a process for the preparation of phenylacetone by the catalytic liquid phase reduction of 1-phenyl-2-nitro-1-propene, the improvement which comprises subjecting a mixture containing phenylnitro propene, formic acid, and sufficient water to cause substantially complete ionization of the formic acid, to the action of molecular hydrogen in the presence of Raney nickel catalyst at elevated pressure.

JOHN B. TINDALL.

References Cited in the file of this patent

UNITED STATES PATENTS

| Number | Name | Date |
| --- | --- | --- |
| 1,879,003 | Alles | Sept. 27, 1932 |
| 2,233,823 | Susie et al. | Mar. 4, 1941 |
| 2,356,582 | Haffner et al. | Aug. 22, 1944 |
| 2,427,822 | Tindall | Sept. 23, 1947 |

FOREIGN PATENTS

| Number | Country | Date |
| --- | --- | --- |
| 406,149 | Germany | Nov. 14, 1924 |
| 360,266 | Great Britain | Nov. 5, 1931 |
| 574,446 | Great Britain | Jan. 7, 1946 |

OTHER REFERENCES

Hass et al.: Chemical Reviews, vol 32, pages 373–430, June 1943.

Kohler et al.: J. Am. Chem. Soc., vol. 45, pages 1281–1289 (1923)

Schales et al: "Ber. deut. chem.," vol. 68, pages 1579–1581 (1935).

Ser. No. 255,882, Haffner et al. (A. P. C.), published April 20, 1943.